United States Patent [19]
de Beers et al.

[11] Patent Number: 5,704,573
[45] Date of Patent: Jan. 6, 1998

[54] APERTURE HELD CLIP TYPE FASTENER

[75] Inventors: James E. de Beers, Hinsdale; David A. Shereyk, Tinley Park, both of Ill.

[73] Assignee: Illinois Tool Works Inc., Glenview, Ill.

[21] Appl. No.: 519,925

[22] Filed: Aug. 28, 1995

[51] Int. Cl.6 ............................................. F16L 3/00
[52] U.S. Cl. ............................................. 248/73; 248/74.2
[58] Field of Search ............................ 248/71, 73, 74.1, 248/74.2, 146, 154

[56] References Cited

U.S. PATENT DOCUMENTS

| | | | |
|---|---|---|---|
| 1,668,953 | 5/1928 | Erickson | 248/74.1 X |
| 1,906,874 | 5/1933 | Platt | 248/316.7 X |
| 2,891,296 | 6/1959 | Darde | 248/74.1 X |
| 3,080,140 | 3/1963 | Gohs et al. | 248/74.1 |
| 3,313,009 | 4/1967 | Beckerer | 248/74.2 |
| 3,430,904 | 3/1969 | Soltysik . | |
| 3,441,986 | 5/1969 | Pritchard | 248/73 |
| 3,521,332 | 7/1970 | Kramer | 248/74.2 X |
| 3,584,348 | 6/1971 | Soltysik . | |
| 3,659,319 | 5/1972 | Erickson | 248/74.1 X |
| 3,807,675 | 4/1974 | Seckereson et al. | 248/73 |
| 3,916,089 | 10/1975 | Sloan . | |
| 4,244,544 | 1/1981 | Kornat . | |
| 4,358,080 | 11/1982 | Wolker . | |
| 4,442,991 | 4/1984 | Levens | 248/146 |
| 4,450,605 | 5/1984 | Schäty . | |
| 4,550,891 | 11/1985 | Schäty | 248/68.1 |
| 4,566,660 | 1/1986 | Anscher et al. | 248/74.2 |
| 4,614,321 | 9/1986 | Andre | 248/74.2 |
| 4,669,688 | 6/1987 | Itoh et al. | 248/74.2 |
| 4,958,791 | 9/1990 | Nakamura | 248/74.1 |
| 5,039,040 | 8/1991 | Idjakiren | 248/71 X |
| 5,316,245 | 5/1994 | Ruckwardt | 248/68.1 |
| 5,346,165 | 9/1994 | Frean et al. | 248/154 X |

FOREIGN PATENT DOCUMENTS

| | | | |
|---|---|---|---|
| 1401899 | 4/1965 | France | 248/74.2 |
| 2221718 | 2/1990 | United Kingdom | 248/73 |

*Primary Examiner*—Alvin C. Chin-Shue
*Assistant Examiner*—Derek J. Berger
*Attorney, Agent, or Firm*—Schwartz & Weinrieb

[57] ABSTRACT

A semi-flexible clip type fastener for gripping and retaining an item having a circular cross-section is disclosed. Protrusions facilitate insertion of the item to be gripped. Upon insertion of the clip into an aperture, deflectable lever arms move the protrusions towards the inserted item, to facilitate retainment of the item in the clip.

20 Claims, 3 Drawing Sheets

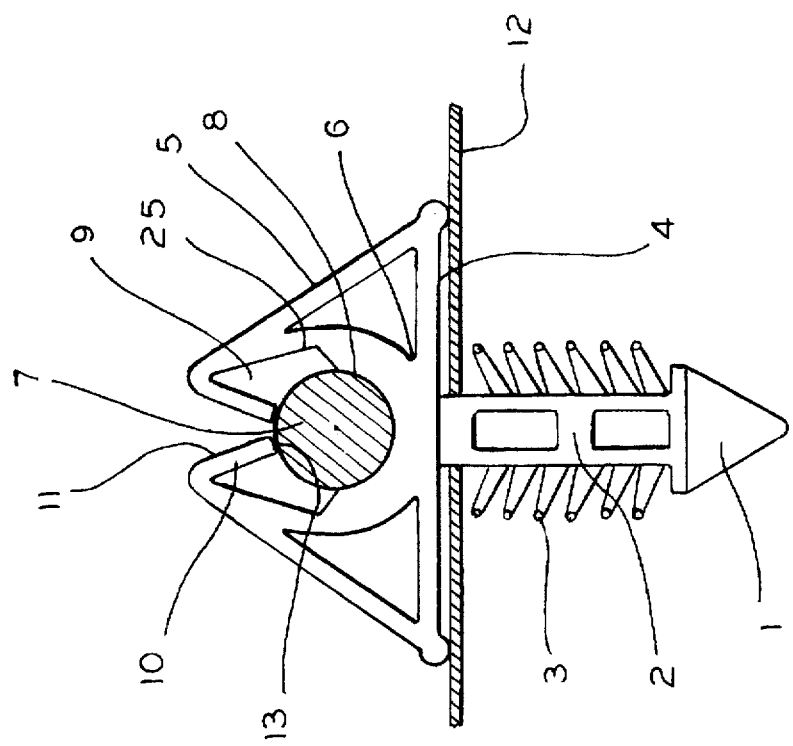
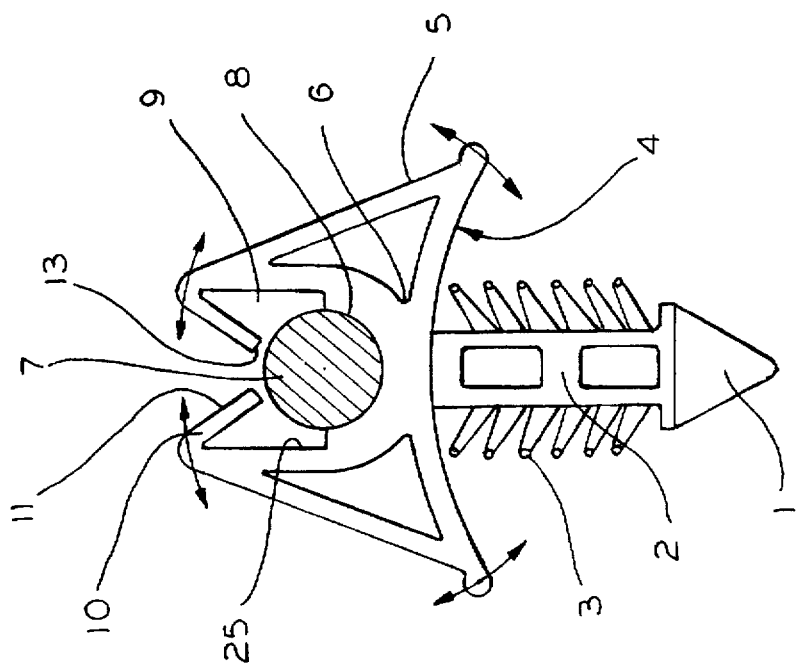

5,704,573

APERTURE HELD CLIP TYPE FASTENER

BACKGROUND OF THE INVENTION

1. Field of the Invention

The subject invention relates generally to fasteners for gripping and holding items such as lines, wires, conduits, and the like, which items may have a circular cross section. The invention also relates to fasteners which are inserted into an aperture in a support panel, such as a sheet panel of an automobile, for retaining the gripped item in a semi-permanent location adjacent the panel.

2. Description of Related Art

In the past, fasteners have been proposed for gripping and holding, in a semi-permanent position, items such as wires or cables. Some of the prior fasteners are formed from a semi-flexible material, and are an arranged to be affixed to a panel by inserting a portion of the fastener through an aperture. However, deficiencies in the prior art have been recognized. In particular, the prior art does not disclose a simple clip structure which would first facilitate the insertion of an item into the clip while the clip is in a pre-installed relaxed state, and then, upon installation of the clip into an aperture of a panel, act to grip and hold the item in a semi-permanent position.

SUMMARY OF THE INVENTION

The present invention relates to the solution of the problem of providing a clip type fastener which first facilitates the insertion of an item into a fastener so as to be gripped and held by the fastener, which item may be of generally circular cross-section, and then upon insertion of the fastener into an aperture of a panel, acts to grip and hold the item in a semi-permanent position. One object of the invention is to provide an efficient fastener structure which, in the pre-installed state, provides surfaces for guiding the item to be held into the fastener. Another object of the invention is to provide a reliable structure which changes its geometry upon insertion into an aperture of a panel so as to more securely grip the item after the fastener is inserted into the panel. These and other objects of the invention are achieved through the structure described herein.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several view, and wherein:

FIG. 1 is a side view of a first embodiment of the invention in the pre-installed state.

FIG. 2 is a side view of a first embodiment of the invention in the installed state.

FIG. 4 is a side view of a second embodiment of the invention in the

DETAILED DESCRIPTION OF THE ILLUSTRATED EMBODIMENTS

Figure 4:
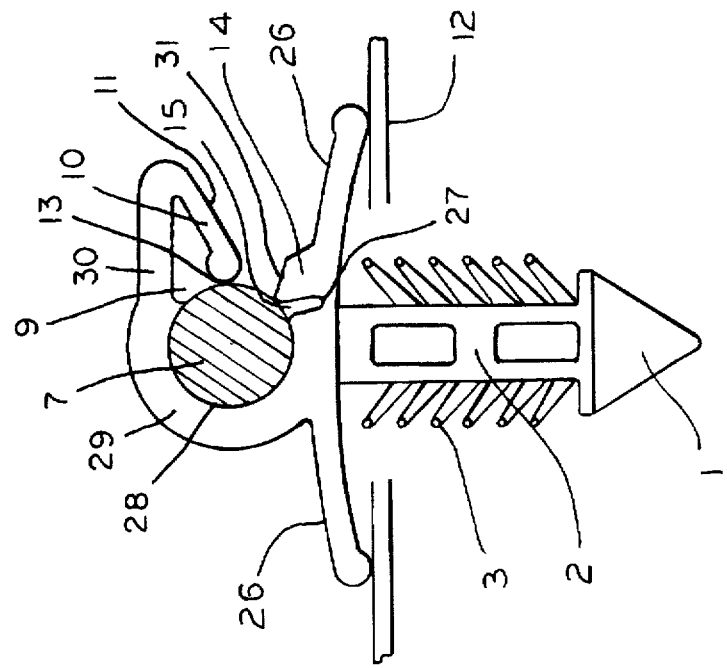

Reference is made to the drawings which set out preferred and also alternate embodiments of the invention. The Figures are illustrative of but not strictly limiting to the invention, as equivalents of the invention are also encompassed by this disclosure.

Referring to FIG. 1, a first embodiment of the invention is shown, in the pre-installed state. This embodiment comprises a panel insertion tip 1 and shaft 2 which are inserted into an aperture of a panel, such as a sheet metal panel of an automobile. The shaft may contain anti-retraction ribs 3 at various locations along the shaft 2.

In one embodiment, the fastener is made of a semi-flexible material such as nylon. Other equivalent metallic and non-metallic materials may also be utilized. The fastener may comprise at least two arcuate lever arms 4, each extending outwardly from the centerline of the shaft 2, in a slightly concave manner around the point at which the shaft 2 meets the arcuate lever arms 4. The arcuate lever arms 4 are at substantially right angles to the shaft 2. Other angular configurations are also possible according to the invention. Near the origin of each of the arcuate lever arms 4 is a flex point 6 which controls and limits the movement of each of the arcuate lever arms 4 in a direction generally longitudinal with respect to a centerline of the shaft 2. Extending from a terminal point of each arcuate lever arm 4 to a point generally distal from the panel insertion tip 1 is a side lever arm 5. Each of the side lever arms 5 extends generally upwardly so as to meet a side wall 25. The side walls 25 extend from the meeting point with the side lever arms 5, in a direction generally longitudinal with respect to the center line of the shaft 2, downwardly to the flex point 6. The general shape formed by the arcuate lever arm 4, the side lever arm 5, and the side wall 25 may be triangular. Other shapes and relationships are also possible according to the invention. A seating surface 8 is provided for receiving a gripped item 7, shown in the drawings as having a generally circular cross-section. Other cross-sectional shapes are possible depending on the application. In this pre-installation state, a gripped item 7 may be inserted by pressing the gripped item 7 into a gripped item void 9 from a point distal from the panel insertion tip 1. In one embodiment, at least two protrusion fingers 10 extend from the meeting point of the side lever arm 5 and the side wall 25, back towards the panel insertion tip 1, at an acute angle with respect to the centerline of the shaft 2. This angle may vary, depending on the flexibility of the fastener material, the flexibility and site of the gripped item 7, the frictional characteristics of the fastener and the gripped item 7, and other factors. Each of the protrusion fingers 10 terminate at a point in the gripped item void 9. The protrusion fingers 10 each exhibit an insertion surface 11, which viewed from the side together generally form a "V" shape, to facilitate insertion of the gripped item 7. The distal end of each protrusion finger 10 may have a protrusion grip surface 13 which acts to restrain the gripped item 7 in the gripped item void 9.

Referring to FIG. 2, the fastener of Figure 1 is shown in the installed state. Panel insertion tip 1, which may have a generally pointed shape to aid insertion, and shaft 2 are inserted into an aperture in panel 12. Anti-retraction ribs 3, which may be angled in a direction away from panel insertion tip 1, act to facilitate installation of the shaft 2, but thereafter oppose withdrawal of the shaft 2 from the aperture.

Upon complete insertion of shaft 2 into the panel aperture, arcuate lever arms 4 are moved by the panel to a less arcuate, less concave shape. The arcuate lever arms 4 may act to create a resilient force which tends to urge the shaft 2 out of the aperture, which movement may be resisted on the other side of the panel 12 by the anti-retraction ribs 3. These offsetting forces may act to hold the fastener firmly against the panel 12. However, this is not the sole function of the arcuate lever arms 4. During the movement of the arcuate lever arms 4 to a less concave shape during insertion of the fastener into the panel apertures, each of the arcuate lever arms 4 flexes at flex point 6, acting on the respective side lever arms 5, side walls 25, and protrusion fingers 10 in a manner which tends to move the protrusion grip surfaces 13 closer to the gripped item 7, to hold the gripped item 7 securely within the gripped item void 9. In one embodiment, the protrusion grip surfaces 13 are moved against the gripped item 7, urging the gripped item 7 against the seating surface 8. In the embodiments of FIGS. 1 and 2, the protrusion fingers 10 serve the dual purpose of first facilitating insertion of the gripped item 7 into the fastener, and then, upon insertion of the fastener into a panel 12, acting to hold the gripped item 7 in the desired location.

Figure 3:
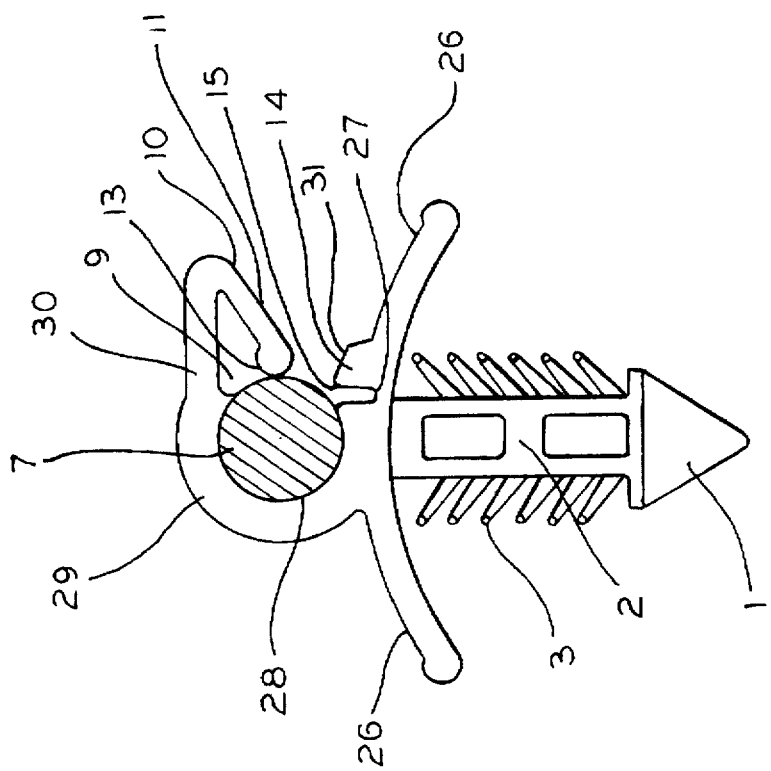
FIG. 3 is a side view of a second embodiment of the invention in the pre-installed state.

Referring to FIG. 3, a further embodiment of the fastener is shown in the pre-installation state. As with the embodiment of FIGS. 1 and 2, a panel insertion tip 1, shaft 2, and anti-retraction ribs 3 are shown. At least two free arcuate lever arms 26 are shown extending away from and at substantially right angles to the shaft 2. Other angular configurations are also possible according to the invention. The free arcuate lever arms 26 may extend outwardly from the centerline of the shaft 2, in a slightly concave manner around the point at which the shaft 2 meets the free arcuate lever arms 26. On the side of at least one of the free arcuate lever arms 26, opposite the shaft 2, there is formed a lever arm protrusion 14 having a lever arm protrusion grip surface 15. Adjacent the lever arm protrusion 14, nearer to the centerline of the shaft 2, is a notched flex point 27. In one embodiment, a generally semi-circular side oriented seating surface 28 extends through an arc from a point near the notched flex point 27 to a point substantially 180° from the notched flex point 27. The side oriented seating surface 28 is contained within a side element 29. The shape of side element 29 may correspond with or be divergent from the shape of the side oriented seating surface 28. The side element 29 may in one embodiment extend from the notched flex point 27 to a point substantially 180° from the notched flex point 27, and then extend into a side element extension 30 which may be arranged at substantially 90° with respect to the centerline of the shaft 2. The side element extension 30 extends away from the centerline of shaft 2 to a point at which it changes direction and extends into a protrusion finger 10. The protrusion finger 10 extends back towards the centerline of shaft 2 at an acute angle with respect to the centerline of shaft 2, and terminates with a protrusion grip surface 13. The interior surfaces of the side element 29, side element extension 30, and protrusion finger 10 define a gripped item void 9. The lever arm protrusion 14 and the protrusion finger 10 present protrusion surfaces 31 and insertion surface 11, respectively. Surfaces 31 and 11 may form a general "V" shape which points toward the centerline of the shaft 2 along a line which is substantially 90° with respect to the centerline of the shaft 2.

For applications which require insertion from one side of the fastener instead of from the top of the fastener, the resulting structure allows insertion of a gripped item 7 in a direction along a line which is at substantially right angles to the centerline of the shaft 2. The lever arm protrusion 14, protrusion finger 10, and the corresponding surfaces 31 and 11, respectively, facilitate insertion of a gripped item 12. In one embodiment, the side element 29, side element extension 30, and protrusion finger 10 are formed from a semi-flexible material which flexes to accept a gripped item 7.

Referring to FIG. 4, the fastener is shown in an installed state. As described for the embodiment of FIG. 2, panel insertion tip 1, shaft 2, and anti-retraction ribs 3 have been inserted into an aperture of a panel 12, whereby the panel 12 exerts a force against free arcuate lever arms 26 which urges them into a less arcuate configuration. As notched flex point 27 flexes and tends to close as a result of the movement of the free arcuate lever arms 26, lever arm protrusion 14 moves toward the gripped item 7, and in one embodiment, lever arm protrusion grip surface 14 is urged against the gripped item 7, holding it in place against the side oriented seating surface 28.

Figure 5:
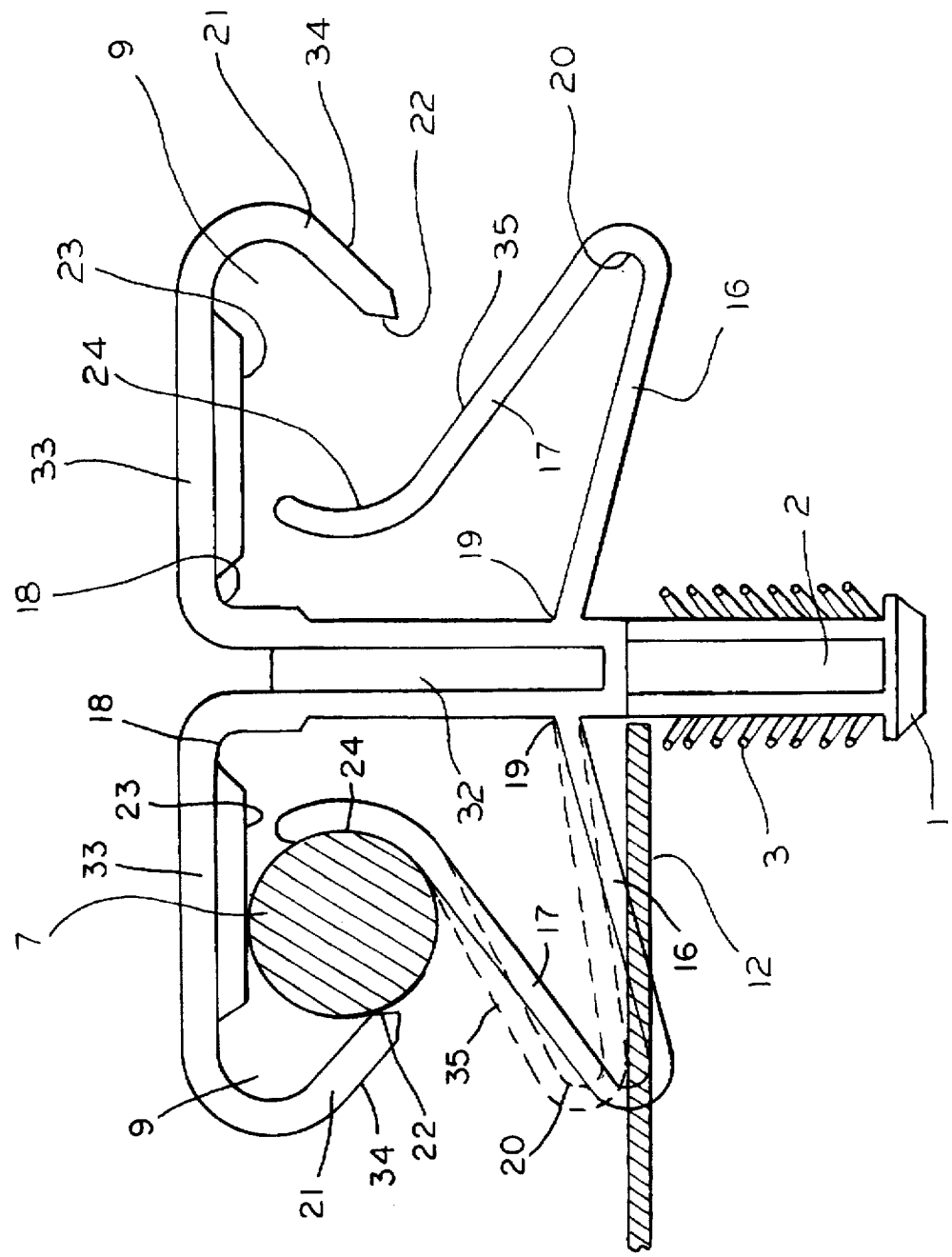
FIG. 5 is a side view of a third embodiment of the invention wherein the left side of the FIGURE shows the fastener of the invention in the installed state as noted by the dotted lines thereof, while the right side of the FIGURE shows the fastener in the pre-installed state.

Referring to FIG. 5, the fastener is shown in an uninstalled and also an installed state. In this embodiment, two gripped items 7 may be held by a single fastener, as gripping means may be provided on both sides of a centerline of shaft 2. As shown and described in the previous embodiments, the fastener of the present embodiment may have a panel insertion tip 1, a shaft 2, and anti-retraction ribs 3. Lower lever arms 16 extend away from the shaft 2 at an acute angle with respect to the centerline of shaft 2, angling toward the panel insertion tip 1. A lower flex point 19 is formed at the base of the lower lever arm 16, at the point at which the lower lever arm 16 meets the shaft 2. The lower lever arm 16 extends to a distal point, and then reverses direction back toward the shaft 2, at distal flex point 20, extending into upper lever arm 17, which terminates with a curved or angled upper lever arm seating surface 24. Center spine 32 extends from shaft 2 along the same line, and then splits into two top arm elements 33. Each of the top arm elements 33 extend away from the centerline of shaft 2, in directions opposite each other, at an angle substantially 90° with respect to the centerline of shaft 2. Upper flex points 18 are formed at the point where the top arms 33 begin to extend away from the center spine 32. Top arms 33 extend to a distal point, and then turn back towards the center spine 32 at an acute angle with respect to the centerline of the center spine 32, extending into outer retaining arms 21, and terminating in outer retaining arm seating surfaces 22.

An upper seating surface 23 is formed along the inside of top arm 33. A gripped item void 9 is defined by the upper seating surface 23, the upper lever arm seating surface 24 which may be concave, the inside surface of the outer retaining arm 21, and the outer retaining arm seating surface 22. The outer retaining arms 21 and upper lever arms 17 exhibit outer retaining arm insertion surfaces 34 and upper lever arm insertion surfaces 35, respectively. These surfaces 34 and 35 generally form a "V" shape which points towards the center spine 32 along a line which is substantially 90° with respect to the centerline of the shaft 2. Surfaces 34 and 35 guide an item 7 to be gripped as it is pressed into the gripped item void 9 in a direction along a line which is at substantially right angles to the centerline of the shaft 2.

In operation, before the fastener is inserted into an aperture of panel 12, a gripped item 7 is inserted into the gripped item void 9, and may contact one or more of the upper lever arm seating surface 24, upper seating surface 23, and outer retaining arm seating surface 22. Upon insertion of the panel insertion tip 1 and shaft 2 into an aperture of the panel 12, the anti-retraction fibs 3 act to oppose the force exerted against the panel 12 as the lower lever arms 16 flex at lower flex points 19. Upper lever arm 17 also flexes at distal flex point 20, thereby decreasing the opening through which the gripped item 7 was originally introduced into the gripped item void 9, and also increasing the force exerted by one or more of the upper lever arm seating surfaces 24, upper seating surfaces 23, and upper retaining arm seating surfaces 22 against the gripped items 7.

In all disclosed embodiments, specific flex points are provided to control and limit the flexing of critical elements of the fastener, resulting in more reliable, predictable, and stable gripping.

The foregoing describes the illustrated embodiments of the present invention, which are also intended to include equivalent structures commensurate with the scope of the disclosure. It is therefore to be understood that within the scope of the appended claims, the present invention may be practiced otherwise than as specifically described herein.

What is claimed is:

1. An aperture held clip type fastener, comprising:

aperture insertion and locking means for insertion through an aperture of a panel and for engaging a first surface of the panel so as to mount said fastener upon the panel;

flexible arcuate lever arm means connected to said aperture insertion and locking means and having distal end portions thereof adapted for en a second opposite surface of the panel upon which said fastener is to be mounted when said aperture insertion and locking means is disposed through the aperture of the panel so as to cooperate with said aperture insertion and locking means in fixedly mounting said fastener upon the panel, said flexible arcuate lever arm means being flexibly movable between a first arcuate state when said aperture insertion and locking means is not disposed through the aperture of the panel and engaged with the first surface of the panel, and a second substantially flattened state when said aperture insertion and locking-means is disposed through the aperture of the panel and engaged with the first surface of the panel;

seating surface means for receivably seating a first side portion of an item to be held within said fastener;

finger means for engaging a second side portion of an item to be held within said fastener so as to bias the item, to be held within said fastener, into engagement with said seating surface means such that the item to be held within said fastener is fixedly retained within said fastener by said finger means and said seating surface means; and side lever arm means operatively connected to said distal end portions of said arcuate lever arm means and to said finger means for transmitting forces from said distal end portions of said arcuate lever arm means to said finger means, so as to cause said finger means to move into engagement with an item seated upon said seating surface means and thereby cooperate with said seating surface means so as to fixedly retain the item, seated upon said seating surface means, within said fastener when said flexible arcuate lever arm means are flexibly moved from said first arcuate state to said second substantially flattened state upon insertion of said aperture insertion and locking means through the aperture of the panel and into engagement with the first surface of the panel upon which said fastener is to be mounted.

2. An aperture held clip type fastener according to claim 1, wherein said aperture insertion and locking means comprises:

a panel insertion tip;
   a shaft portion; and
   anti-retraction ribs disposed upon said shaft portion;

said shaft portion being connected to an underside of said flexible arcuate lever arm means which is adapted to be disposed toward the second surface of the panel, wherein said anti-retraction ribs are adjusted to engage the first surface of the panel and force said distal end portions of said flexible arcuate lever arm means into engagement with the second surface of the panel, cause said flexible arcuate lever arm means to move from said first arcuate state to said second substantially flattened state, and maintain said arcuate lever arm means in said second substantially flattened state when said aperture insertion and locking means is inserted through said panel aperture.

3. An aperture held clip type fastener as set forth in claim 2, wherein:

said shaft portion has a longitudinal extent defining a longitudinal axis; and said anti-retraction ribs comprise two sets of longitudinally spaced anti-retraction ribs disposed upon opposite sides of said longitudinal axis of said shaft portion.

4. An aperture held clip type fastener as set forth in claim 1, further comprising:

sidewalls having said seating surface means, for receivably seating and supporting a first side portion of an item to be held within said fastener, defined therein.

5. An aperture held clip type fastener as set forth in claim 4, wherein:

said aperture insertion and locking means has a longitudinal extent defining a longitudinal axis;

said flexible arcuate lever arm means comprises a pair of flexible arcuate lever arms projecting transversely with respect to said longitudinal axis of said aperture insertion and locking means;

said sidewalls comprise a pair of sidewalls disposed upon opposite sides of said longitudinal axis and connected at first proximal end portions to said pair of flexible arcuate lever arms;

said side lever arm means comprises a pair of side lever arms interconnecting said distal end portions of said flexible arcuate lever arms and second distal end portions of said pair of sidewalls; and said finger means comprises a pair of fingers connected to said second distal end portions of said pair of sidewalls and extending inwardly toward said longitudinal axis and toward said seating surface means.

6. An aperture held clip type fastener as set forth in claim 5, wherein:

said pair of flexible arcuate lever arms are connected at proximal end portions thereof to said first proximal end portions of said pair of sidewalls so as to define respective flexure points about which said pair of flexible arcuate lever arms flex when said pair of flexible arcuate lever arms are moved from said first arcuate state to said second substantially flattened state.

7. An aperture held clip type fastener as set forth in claim 5, wherein:

said pair of fingers cooperate with said seating surface means in defining a void within which an item seated upon said seating surface means is to be retained; and said pair of fingers each comprise insertion surface means for guiding the item into said void such that the item can be properly seated upon said seating surface means, and a protrusion grip surface at a distal end portion of said insertion surface means for engaging the item seated upon said seating surface means when said fastener is mounted upon the panel and said pair of side lever arms transmits said forces from said pair of flexible arcuate lever arms to said pair of fingers.

8. An aperture held clip type fastener as set forth in claim 5, wherein:

said longitudinal axis extends substantially horizontally;

said pair of flexible arcuate lever arms extend substantially horizontally;

said pair of sidewalls extend substantially vertically with respect to said pair of flexible arcuate lever arms; and said pair of side lever arms extend at an angle with respect to said pair of flexible arcuate lever arms and said pair of sidewalls such that each one of said pair of flexible arcuate lever arms, together with one of said pair of sidewalls and one of said pair of side lever arms defines a structure having a substantially triangular configuration.

9. In combination, an aperture held clip type fastener and an item to be held thereby, comprising:

an item to be fixedly mounted upon a panel member;

aperture insertion and locking means for insertion through an aperture of the panel member and for engaging a first surface portion of the panel member so as to mount said fastener upon the panel member;

flexible arcuate lever arm means connected to said aperture insertion and locking means and having distal end portions thereof adapted for engaging a second opposite surface portion of the panel member upon which said fastener is to be mounted when said aperture insertion and locking means is disposed through the aperture of the panel member so as to cooperate with said aperture insertion and locking means in fixedly mounting said fastener upon the panel member, said flexible arcuate lever arm means being flexibly movable between a first arcuate state when said aperture insertion and locking means is not disposed through the aperture of the panel member and engaged with the first surface portion of the panel, and a second substantially flattened state when said aperture insertion and locking means is disposed through the aperture of the panel member and engaged with the first surface portion of the panel member;

seating surface means for receivably seating a first side portion of said item to be held within said fastener;

finger means for engaging a second side portion of said item to be held within said fastener so as to bias said item, to be held within said fastener, into engagement with said seating surface means such that said item to be held within said fastener is fixedly retained within said fastener by said finger means and said seating surface means; and side lever arm means operatively connected to said distal end portions of said flexible arcuate lever arm means and to said finger means for transmitting forces from said distal end portions of said flexible arcuate lever arm means to said finger means, so as to cause said finger means to move into engagement with said item seated upon said seating surface means and thereby cooperate with said seating surface means so as to fixedly retain said item, seated upon said seating surface means, within said fastener when said flexible arcuate lever arm means are flexibly moved from said first arcuate state to said second substantially flattened state upon insertion of said aperture insertion and locking means through the aperture of the panel member and into engagement with the first surface of the panel member upon which said fastener is to be mounted.

10. The combination as set forth in claim 9, wherein said aperture insertion and locking means comprises:

a panel insertion tip;

a shaft portion; and anti-retraction ribs disposed upon said shaft portion;

said shaft portion being connected to an underside of said flexible arcuate lever arm means which is adapted to be disposed toward the second surface of the panel member, wherein said anti-retraction ribs are adapted to engage the first surface of the panel member and force said distal end portions of said flexible arcuate lever arm means into engagement with the second surface of the panel member, cause said flexible arcuate lever arm means to move from said first arcuate state to said second substantially flattened state, and maintain said flexible arcuate lever arm means in said second substantially flattened state when said aperture insertion and locking means is inserted through said panel aperture.

11. The combination as set forth in claim 10, wherein:

said shaft portion has a longitudinal extent defining a longitudinal axis; and said anti-retraction ribs comprise two sets of longitudinally spaced anti-retraction ribs disposed upon opposite sides of said longitudinal axis of said shaft portion.

12. The combination as set forth in claim 9, further comprising:

sidewalls having said seating surface means, for receivably seating and supporting said first side portion of said item to be held within said fastener, defined therein.

13. The combination as set forth in claim 12, wherein:

said aperture insertion and locking means has a longitudinal extent defining a longitudinal axis;

said flexible arcuate lever arm means comprises a pair of flexible arcuate lever arms projecting transversely with respect to said longitudinal axis of said aperture insertion and locking means;

said sidewalls comprise a pair of sidewalls disposed upon opposite sides of said longitudinal axis and connected at first proximal end portions to said pair of flexible arcuate lever arms;

said side lever arm means comprises a pair of side lever arms interconnecting said distal end portions of said flexible arcuate lever arms and second distal end portions of said pair of sidewalls; and said finger means comprises a pair of fingers connected to said second distal end portions of said pair of sidewalls and extending inwardly toward said longitudinal axis and toward said seating surface means.

14. The combination as set forth in claim 13, wherein:

said pair of flexible arcuate lever arms are connected at proximal end portions thereof to said first proximal end portions of said pair of sidewalls so as to define respective flexure points about which said pair of flexible arcuate lever arms flex when said pair of flexible arcuate lever arms are moved from said first arcuate state to said second substantially flattened state.

15. The combination as set forth in claim 13, wherein:

said pair of fingers cooperate with said seating surface means in defining a void within which said item seated upon said seating surface means is to be retained; and said pair of fingers each comprise insertion surface means for guiding said item into said void such that said item can be properly seated upon said seating surface means, and a protrusion grip surface at a distal end portion of said insertion surface means for engaging said item seated upon said seating surface means when said fastener is mounted upon the panel member and said pair of side lever arms transmit said forces from said pair of flexible arcuate lever arms to said pair of fingers.

16. The combination as set forth in claim 13, wherein:

said longitudinal axis extends substantially horizontally;

said pair of flexible arcuate lever arms extend substantially horizontally;

said pair of sidewalls extend substantially vertically with respect to said pair of flexible arcuate lever arms; and said pair of side lever arms extend at an angle with respect to said pair of flexible arcuate lever arms and said pair of sidewalls such that each one of said pair of flexible arcuate lever arms, together with one of said pair of sidewalls and one of said pair of side lever arms defines a structure having a substantially triangular configuration.

17. In combination, an aperture held clip type fastener for mounting within a panel member, and an item to be held within said fastener for mounting upon said panel member, comprising:

a panel member having an aperture defined therein;

an item to be fixedly mounted upon said panel member;

aperture insertion and locking means for insertion through said aperture of said panel member and for engaging a first surface portion of said panel member so as to mount said fastener upon said panel member;

flexible arcuate lever arm means connected to said aperture insertion and locking means and having distal end portions thereof adapted for engaging a second opposite surface portion of said panel member upon which said fastener is to be mounted when said aperture insertion and locking means is disposed through said aperture of said panel member so as to cooperate with said aperture insertion and locking means in fixedly mounting said fastener upon said panel member, said flexible arcuate lever arm means being flexibly movable between a first arcuate state when said aperture insertion and locking means is not disposed through said aperture of said panel member and engaged with said first surface portion of said panel member, and a second substantially flattened state when said aperture insertion and locking means is disposed through said aperture of said panel member and engaged with said first surface portion of said panel member;

seating surface means for receivably seating a first side portion of said item to be held within said fastener;

finger means for engaging a second side portion of said item to be held within said fastener so as to bias said item, to be held within said fastener, into engagement with said seating surface means such that said item to be held within said fastener is fixedly retained within said fastener by said finger means and said seating surface means; and side lever arm means operatively connected to said distal end portions of said flexible arcuate lever arm means and to said finger means for transmitting forces from said distal end portions of said flexible arcuate lever arm means to said finger means, so as to cause said finger means to move into engagement with said item seated upon said seating surface means and thereby cooperate with said seating surface means so as to fixedly retain said item, seated upon said seating surface means, within said fastener when said flexible arcuate lever arm means are flexibly moved from said first arcuate state to said second substantially flattened state upon insertion of said aperture insertion and locking means through said aperture of said panel member and into engagement with said first surface portion of said panel member upon which said fastener is to be mounted.

18. The combination as set forth in claim 17, further comprising:

sidewalls having said seating surface means, for receivably seating and supporting said first side portion of said item to be held within said fastener, defined therein.

19. The combination as set forth in claim 18, wherein:

said aperture insertion and locking means has a longitudinal extent defining a longitudinal axis, two sets of longitudinally spaced anti-retraction ribs being disposed upon opposite sides of said longitudinal axis;

said flexible arcuate lever arm means comprises a pair of flexible arcuate lever arms projecting transversely with respect to said longitudinal axis of said aperture insertion and locking means;

said sidewalls comprise a pair of sidewalls disposed upon opposite sides of said longitudinal axis and connected at first proximal end portions to said pair of flexible arcuate lever arms so as to define respective flexure points about which said pair of flexible arcuate lever arms flex when said pair of flexible arcuate lever arms are moved from said first arcuate state to said second substantially flattened state;

said side lever arm means comprises a pair of side lever arms interconnecting said distal end portions of said flexible arcuate lever arms and second distal end portions of said pair of sidewalls; and said finger means comprise a pair of fingers connected to said second distal end portions of said pair of sidewalls and extending inwardly toward said longitudinal axis and toward said seating surface means.

20. The combination as set forth in claim 19, wherein:

said longitudinal axis extends substantially horizontally;

said pair of flexible arcuate lever arms extend substantially horizontally;

said pair of sidewalls extend substantially vertically with respect to said pair of flexible arcuate lever arms; and said pair of side lever arms extend at an angle with respect to said pair of flexible arcuate lever arms and said pair of sidewalls such that each one of said pair of flexible arcuate lever arms, together with one of said pair of sidewalls and one of said pair of side lever arms defines a structure having a substantially triangular configuration.

* * * * *